UNITED STATES PATENT OFFICE.

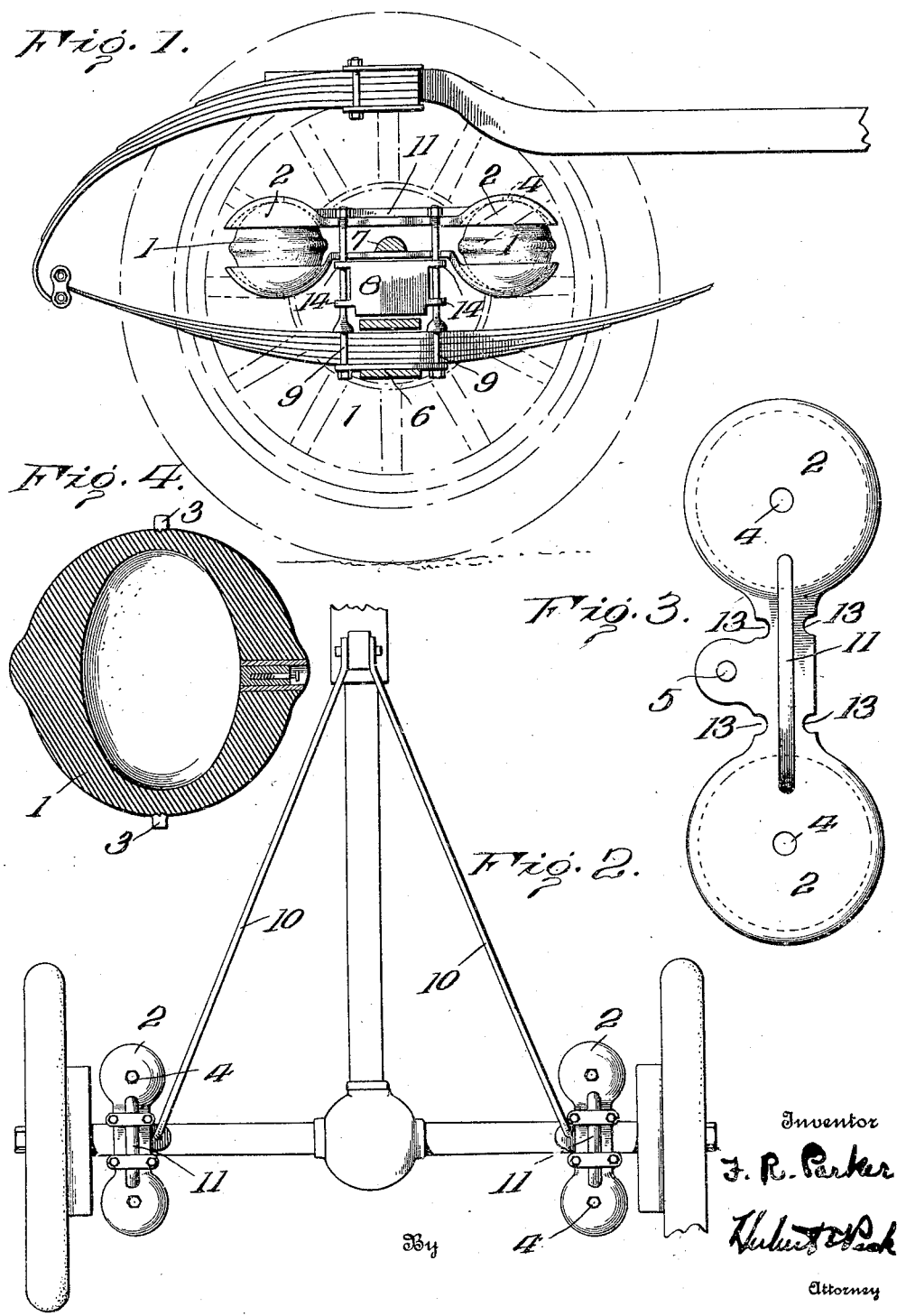

FRANK ROBERT PARKER, OF BATTLE CREEK, MICHIGAN.

SHOCK-ABSORBER.

1,200,644.  Specification of Letters Patent.  Patented Oct. 10, 1916.

Application filed June 11, 1915. Serial No. 33,442.

*To all whom it may concern:*

Be it known that I, FRANK ROBERT PARKER, a citizen of the United States, residing at Battle Creek, in the county of Calhoun and State of Michigan, have invented certain new and useful Improvements in Shock-Absorbers, of which the following is a specification.

This invention relates to certain improvements in shock absorbers; and the objects and nature of the invention will be readily understood by those skilled in the art in the light of the following explanation of the accompanying drawings illustrating what I now believe to be the preferred embodiment from among other formations and arrangements within the spirit and scope of my invention.

An object of the invention is to lessen the cost of vehicle and automobile tires and maintenance thereof.

A further object of the invention is to permit the use of hard or solid tires upon automobiles and vehicles and obtain the same results in riding qualities as with pneumatic tires.

A further object of the invention is to provide a shock absorber of extreme simplicity of structure and design and of small cost to manufacture.

A further object of the invention is to provide a shock absorber for use between a spring and axle with either the spring suspended below the axle or disposed upon the top of the axle.

A further object of the invention is to provide pneumatic shock absorbing means between axles and springs of vehicles and automobiles.

A further object of the invention is to provide a shock absorber for use on vehicles and automobiles which comprises two inflatable balls interposed between the axles and springs of the vehicle or automobile.

The invention consists in certain novel features in construction and in combinations and arrangements as more fully and particularly set forth hereinafter.

Referring to the accompanying drawings:

Figure 1, is a side elevation of my shock absorber applied to the rear axle and spring of a motor vehicle. Fig. 2, is a top plan of the rear of the chassis of a motor vehicle showing my shock absorber attached thereto. Fig. 3, is a top plan of one of the cup members of my shock absorber. Fig. 4, is a vertical section of one of the pneumatic balls of my shock absorber showing the valve for inflation thereof.

My invention comprises similar upper and lower members having hollow inflated balls or other members interposed between them. These upper and lower members are adapted for fastening upon the springs and axles of vehicles of any kind in such a manner that the body of the vehicle is supported by the springs, the axle and the shock absorbers interposed therebetween, so when traveling over rough or uneven roads or other surfaces the body rides easily and the severe shocks and jolts are absorbed or greatly lessened by the air filled cushioning means between the upper and lower members which move toward or away from each other controlled in their movements toward each other by the inflated members.

Referring now to the accompanying drawings, I show the members 2, having a shank 11. These members 2, are cup-like in shape and at the center are provided with the apertures 4. The shank 11, is provided with an ear or lug protruding from one side thereof which has a hole or aperture 5, in the center thereof. The edges of this shank 11, have the slots 13, formed therein to act as guides for certain members which will appear hereinafter.

Referring now particularly to Fig. 1, of the drawings, where I disclose a shock absorber of my invention, completely assembled and attached to an axle and spring of a vehicle; I show the members 2, having the inflatable members 1, interposed therebetween, and the lower member resting upon the axle 8, of the vehicle and the upper member resting upon the interposed pneumatic members. The axle 8, is provided with projections or lugs 14, having holes therein through which I pass the spring clip bolts 9. These bolts are attached to the spring of the vehicle passed upwardly through the projections 14, into the guides 13, of the upper and lower shanks 11 of the members 2, and at their upper ends have suitable nuts attached thereto or their ends flared or spread in such a manner as to hold the upper member in position upon the interposed pneumatic members 1. In the drawings, I have shown a strap 6, passing around the spring clip and the axle to prevent any appreciable noise occasioned by the movement of the spring, attached spring clip, and its attendant bolts. I also provide a member 7, upon the upper side of the lower shank 11, to catch or act as a rest for the upper member 2, in case of deflation of the interposed members 1 and thus any danger of injury to these members 1, is forestalled.

Now to particularly describe the members 1, which are interposed between the upper and lower members 2, which I clearly show in Fig. 4, of the drawings. These members are preferably spherical in shape and hollow and provided with projections 3, at their opposite poles. I also construct these members with thickened walls and an outward bulge around the surface thereof and mid-way the projection 3. The object of this bulge is to strengthen the member 1 and prevent cutting or breaking thereof when one of the members 2, is pressed down upon the member 1, in its operation in my shock absorber. The members 1, are provided with a suitable valve or other appropriate means whereby they may be inflated or deflated as the necessity may arise, and this valve is preferably located at some place within the bulge above referred to so that there will be no weakening of the member.

The members 1, in the assembling my shock absorber, are placed between the upper and lower cup-like members 2, and the projections 3, are placed into the opening or apertures 4, of the members 2. The members 1, are made having a smaller radius than the inside radius of the cup-like members 2, which prevents any cutting or mashing of the walls of the members 1, when they are pressed down upon or squeezed by the members 2.

In Fig. 2, of the drawings, I clearly show the rear axle of a vehicle provided with my shock absorber and in this figure bring out the auxiliary radius rods 10, which perform the function of keeping the upper members 2, properly spaced and rigid and further strengthens the position of the shock absorber. These radius rods are carried at one end of the holes 5, of the ears or lugs projecting from the shanks 11, of the upper member 2.

The operation of a shock absorber of my invention is as follows, referring particularly to Fig. 1, of the drawings: The member 1, interposed between the cup-like members 2, are inflated and are retained in proper operative position by the projections 3, placed in the apertures 4, of the members 2. The shank 11, of the lower members 2, rests, in the particular example illustrated, upon the axle 8, of the vehicle. The upper members 2, rest upon the members 1, and are held in this position by the radius rods 10, and by the spring clip bolts 9, which rest in the guides 13, on the edges of the shank 11. The lower member 2, is retained in proper position by the bolts 9, passing through the alined guides 13, of the shank 11, of this lower member. These bolts 9, are held at their lower ends by a spring clip which is fastened to the spring of the vehicle. As before mentioned, a strap 6, is placed around the clip and spring to act as a noise deadener. Now, it is clearly seen that the upper members 2, are rigid with and hence move with the spring clip bolts 9, which in turn are rigid with and move with the spring to which the clip is fastened and that any movement up or down of the spring causes a corresponding movement of the upper members 2, which are fast to the upper ends of the bolts 9. The bolts 9, pass through the projections 14, on the axle 8, and are slidably contained therein and they are likewise slidably mounted in the guides 13, on the shank 11, of the lower members 2. Hence, it follows that a downward movement of the spring to which the spring clip and its attendant bolts are attached will pull the shank 11, with its members 2, downward and the members 2, will bear upon the pneumatic members 1, and be restrained thereby which will cause a restraint and cushioning effect upon the body of the vehicle carried by the springs.

My invention, it will be seen from the foregoing description of the accompanying drawings, when placed at proper positions upon a vehicle, will absorb all the shocks and jolts attendant with use of a vehicle or at least so reduce them as to make a vehicle as easy riding as possible. By means of my shock absorbers, hard or solid tires may be substituted for the expensive, unreliable and troublesome pneumatic tires with none of the hard riding qualities following upon adoption of such character of tires. The air inflated balls carried by my shock absorbers will completely take the place of pneumatic tires on a vehicle. The small cost of my invention will make it desirable to make such a change as referred to above and due to the simplicity of design and construction the greatly feared and unavoidable tire troubles which go with pneumatic tires will be completely overcome and done away with.

I do not wish to limit myself to any particular form of inflatable member or cushioning member, or to any particular class of material used in making these members, nor do I limit myself to the form and shape of the members which hold and rest upon the cushioning means. It is also understood that the particular means disclosed herein for clamping or fixing these members to the parts of the vehicle, can be replaced by any other efficient and practical means without departing from the spirit and scope of my invention.

It is evident that various changes and modifications might be resorted to in the forms, constructions and arrangements of the parts described without departing from the spirit and scope of my invention and hence I do not wish to limit myself to the exact disclosure hereof.

What I claim is:

1. A shock absorber comprising upper and lower members movable toward and from each other, approximately spherical hollow inflatable members having thicker walls at their horizontal circumference, placed between the ends of said members to form cushioning means therebetween and means for fastening said movable members upon the body and running gear of a vehicle, respectively.

2. A device of the character substantially as described, comprising two members having a shank and enlarged ends, a spring clip having elongated bolts extending upwardly upon which one of said members is fastened and upon which the other is free to slide, inflatable members interposed between said aforementioned members, said spring clip fastened to the body, and one of said first mentioned members fastened on the running gear, respectively, of a vehicle.

3. A device of the character substantially as described, comprising opposed members movable from and toward each other, said members having cup-like holders formed at their ends, cushioning means retained by said holders and interposed therebetween, fastening means applied to both members midway their ends for attachment to the body and running gear, respectively, of a vehicle, and bracing means carried by one of said members and the running gear of the vehicle, respectively.

4. A device of the character substantially as described, comprising members movable from and toward each other, cushioning means interposed between said members consisting of resilient elements thickest through their horizontal cross sections, and means for fastening said members to the running gear and body, respectively, of a vehicle.

5. A device of the character substantially as described, comprising members movable from and toward each other, cushioning means interposed therebetween, said cushioning means consisting of hollow members having thicker walls at their horizontal circumference, and means for fastening said members in operative position upon a vehicle.

6. A device of the character substantially as described, comprising hollow inflatable members having thicker walls at their horizontal circumference, members movable from and toward each other carried by the running gear and body, respectively, of a vehicle, said inflatable members interposed between the ends of said other members and means carried by said inflatable members for maintaining operative position between said other members.

7. A device of the character substantially as described, comprising opposed members movable on means fastened to the running gear and body, respectively, of a vehicle, said members formed with enlarged cup-like ends, cushioning means interposed between the ends thereof and retained by the cups formed therein, and means for bracing said members against horizontal movement.

8. A device of the character substantially as described, comprising members consisting of shanks having enlarged ends forming cup-shaped retainers, said members fastened to the running gear and body, respectively, of a vehicle, means connecting said members whereby said members may move from and toward each other, inflatable resilient elements interposed between the ends of said members and provided with reinforcing means at their horizontal circumference and with projections adapted to be inserted in suitable openings in said cup-shaped retainers, said resilient elements supported in and retained by said cup shaped enlarged portions formed at the ends of said members, and bracing means for said members.

9. A device of the character substantially as described, comprising two similar members having enlarged ends forming retainers, one of said members supported midway its ends on the axle of a vehicle and provided midway its ends with guides, guiding and retaining means on said axle, the other of said members supported midway its ends a distance beyond said first mentioned member by means fixed to the spring of a vehicle and extending through the guiding and retaining means on said axle and the guides on said first mentioned member, and resilient shock absorbing elements interposed between the ends of said members.

In testimony whereof I affix my signature in the presence of two witnesses.

FRANK ROBERT PARKER.

Witnesses:
E. R. MORTON,
CHAS. C. GREEN.

Copies of this patent may be obtained for five cents each, by addressing the "Commissioner of Patents, Washington, D. C."